United States Patent [19]
Turman

[11] 3,912,631
[45] Oct. 14, 1975

[54] OIL FILTER AND ADAPTER

[76] Inventor: William C. Turman, 1455 N. Magnolia, El Cajon, Calif. 92020

[22] Filed: Apr. 8, 1974

[21] Appl. No.: 459,115

Related U.S. Application Data

[62] Division of Ser. No. 261,489, June 9, 1972, Pat. No. 3,802,564.

[52] U.S. Cl. ................................. 210/136; 210/439
[51] Int. Cl.² ........................................ B01D 35/14
[58] Field of Search ............................ 210/136, 439

[56] References Cited
UNITED STATES PATENTS

| | | | |
|---|---|---|---|
| 1,872,430 | 8/1932 | Ericson | 210/439 |
| 2,106,218 | 1/1938 | Krieck | 210/439 X |
| 3,369,666 | 2/1968 | Hultgren et al. | 210/136 X |
| 3,481,478 | 12/1969 | Williams | 210/439 |
| 3,710,942 | 1/1973 | Rosenberg | 210/136 |

*Primary Examiner*—Frank A. Spear, Jr.
*Attorney, Agent, or Firm*—Brown & Martin

[57] ABSTRACT

A special filter for use with an oil filter adapter which oil filter adapter has a central bore with a valve discharge for passing oil to the filter and has a radially displaced oil receiving port for receiving oil from the filter, which filter has a valve in the filter core that traps and minimizes dripping when the filter is changed and the filter valve and adapter valve act together to control oil flow.

3 Claims, 3 Drawing Figures

OIL FILTER AND ADAPTER

This is a division of U.S. pat. No. 3,802,564.

BACKGROUND OF THE INVENTION

The common types of oil filters used on vehicles engines are usually either full flow or partial flow. In the full flow type all of the oil passes through the filter, and any blockage starves the engine of oil. In the partial flow type, some oil is bypassed and forced through the filter body, the filtered oil returning through the central core of the filter under pressure. Oil enters the filter through multiple small inlets and the larger particles tend to accumulate near the inlets, causing undesirable clogging. The filter usually screws on or otherwise is attached to a mounting on the engine, and when the filter is changed, a considerable amount of oil drips from the engine and the filter.

SUMMARY OF THE INVENTION

The filter assembly described herein includes a filter cartridge and a special adapter, which together provide an efficient filtering action and minimize dripping when the filter is changed. The adapter attaches to the existing filter mounting on the engine and has ducts which carry the oil to a central channel, in which is a threaded connection to receive the filter. Oil is thus injected into the central core of the filter and the flow tends to drive particulate matter well into the filter for distribution over a large area of the filtering medium. The flow is thus opposite to the usual arrangement wherein the oil enters the filter element and exits through the core. A valve in the adapter allows oil to enter the filter only above a predetermined pressure, so that, on starting the engine, the initial oil flow lubricates the moving parts rapidly before filtering begins.

The filter cartridge is provided with a one way valve at the inlet the valve being a resilient diaphragm type which also acts as a seal between the body and central core in the filter. The filter valve prevents oil from returning through the inlet and thus minimizes leakage and dripping from a used filter when removed from the adapter. Filtered oil passes through a metering port in the adapter and is returned to the engine at substantially ambient pressure.

The primary object of this invention is to provide a new and improved oil filter and adapter.

Another object of this invention is to provide a new and improved oil filter and adapter combination which attaches to the existing filter mounting of an engine.

Another object of this invention is to provide a new and improved oil filter and adapter combination in which oil flows in through the central core and out through the body in such a manner as to reduce clogging of the filter material.

A further object of this invention is to provide a new and improved oil filter and adapter combination having valves to control flow and to minimize leakage.

Other objects and many advantages of this invention will become more apparent upon a reading of the following detailed description together with an examination of the drawing wherein like reference numerals refer to like parts throughout and in which.

DESCRIPTION OF THE PREFERRED EMBODIMENT

Figure 1:
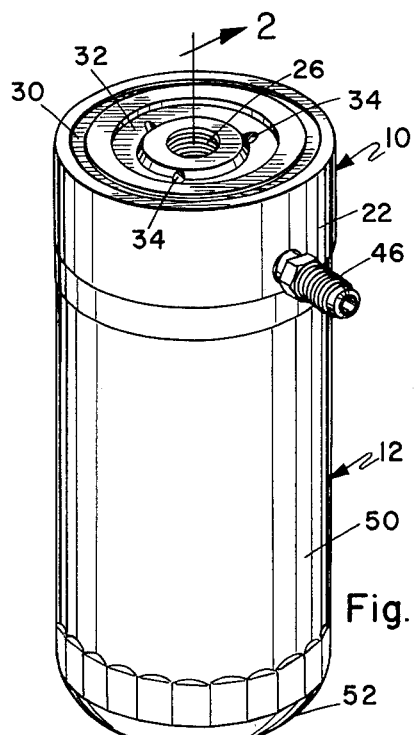
FIG. 1 is a perspective view of the filter and adapter assembly.
Figure 3:
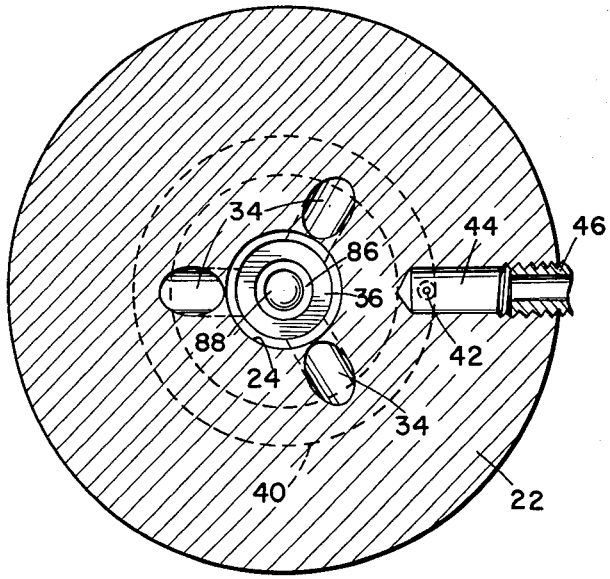
FIG. 3 is a sectional view taken on line 3—3 of FIG. 2.
Figure 2:
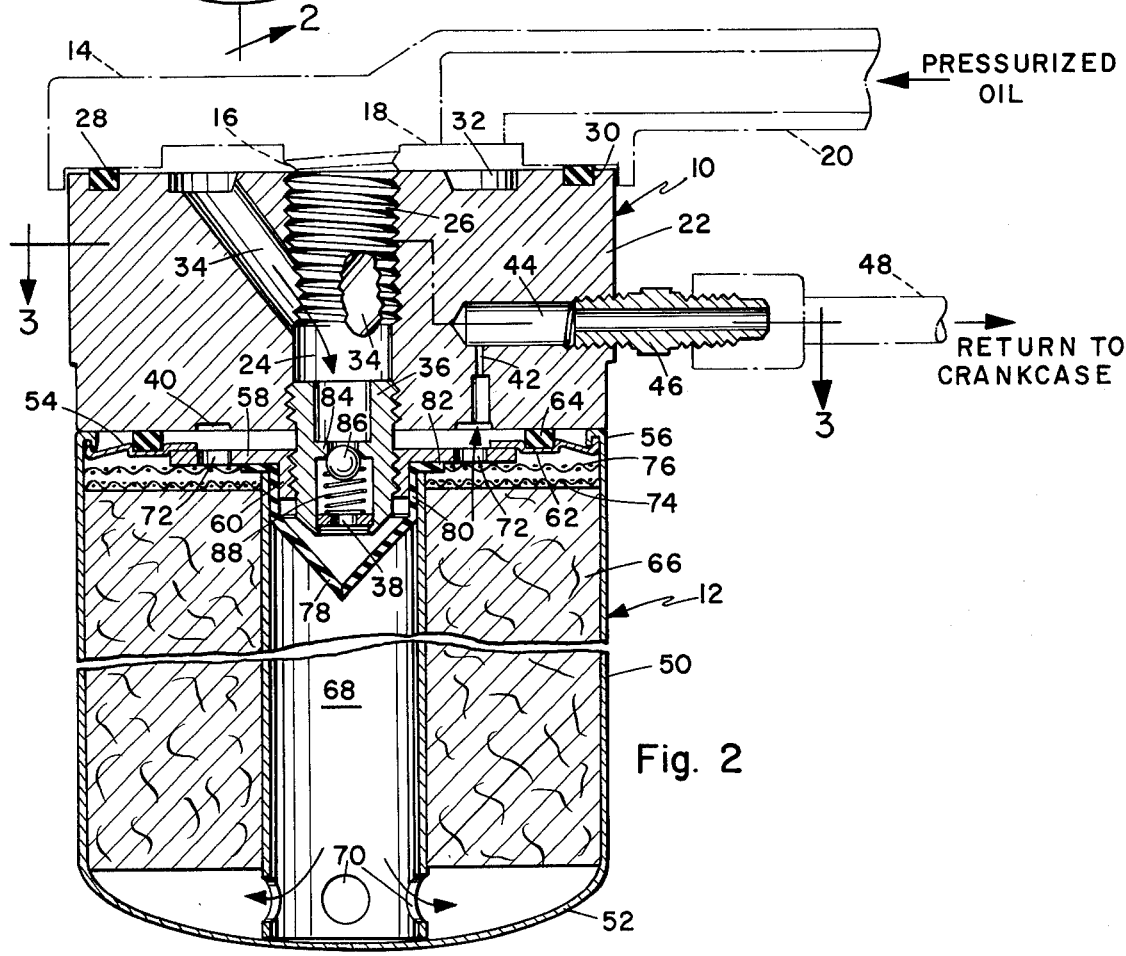
FIG. 2 is an enlarged sectional view taken on line 2—2 of FIG. 1.

The assembly comprises an adapter 10 and a filter cartridge 12, which is a disposable and readily replaceable unit. Adapter 10 is designed to be attached to the existing mounting 14, to which the filter is usually attached directly. The mounting arrangement can vary, the example illustrated having a threaded stud 16, with a concentric recessed channel 18 to which pressurized oil is admitted through a supply duct 20. Other mountings may use clamp bands, screws, or other securing means, it being obvious that adapter 10 can be made to fit as necessary.

The adapter 10 has a cylindrical body 22 with an axial bore 24, the upper portion of which has threads 26 to receive stud 16. A ring gasket 28 is inset into a groove 30 in the upper face of the body, to seal against the mounting 14 outside channel 18. In the upper end of body 22, concentric with bore 24, is a recessed channel 32, from which inlet ducts 34 converge downwardly into the central bore. Three inlet ducts are indicated, but any convenient number may be used. Secured in the lower end of bore 24 is a threaded plug 36 having an inlet port 38 in its lower end. In the lower face 39 of body 22, concentric with plug 36, is a shallow collecting channel 40. A small metering port 42 extends from channel 40 to an outlet duct 44, which opens radially from body 22. Secured in outlet duct 44 is threaded connector 46, for attachment of an oil return line 48 back to the engine.

Filter cartridge 12 comprises a substantially cylindrical canister 50 with a closed lower end 52 and a top cap 54 fixed into the upper end 56. In the center of top cap 54 is a mounting plate 58 having a threaded nut portion 60 to receive plug 36, the nut portion being cylindrical and projecting below the mounting plate. The top cap has a ring groove 62 to hold a gasket 64, for sealing the filter cartridge to the adapter. As illustrated, the filter cartridge 12 is a sealed disposable unit, but could easily be adapted for using replaceable filter elements by making the upper portions removable.

The filter element 66 has a tubular central core 68 which fits around nut portion 60 and seats against the lower end 52. Element 66 can be of various materials, such as a roll of tissue paper, pleated paper, fiber, or the like, the rolled tissue being particularly effective. The lower end of core 68 extends below the filter element body and has openings 70 for oil passage out of the core. Mounting plate 58 has outlets 72 outside the core the filter element being spaced from the mounting plate by an inner screen 74 and an outer screen 76. The inner screen 74 is of fine wire mesh to prevent the filter element from being pressed into the outer screen 76, which is of coarser mesh to space the filter from the cap and allow the oil to escape.

In the upper end of core 68 is a valve 78 of the slit diaphragm type and made of rubber or the like. Valve 78 has a cylindrical body 80 fitting closely around nut portion 60 and an outwardly projecting flange 82 which forms a seal between mounting plate 58 and the upper end of core 68. The valve 78 admits oil into the core but closes against return flow, and also prevents leakage of oil between the core and the upper end of the filter element.

In the plug 36 is a valve seat 84 into which a valve ball 86 is seated by a spring 88. The valve will allow oil to pass from bore 24 through inlet port 36 at a pressure sufficient to unseat ball 86, but will close at lower or back pressure. The opening pressure is substantially lower than the normal operating oil pressure of the engine, and merely ensures proper circulation of oil in the engine at starting, before filtering commences.

In operation, oil is forced through ducts 34 and bore 24, then through valves 86 and 78 into the filter core 68. The flow tends to carry particulate matter down into the core and out through opening 70 to the filter element 66, the entire lower end surface of the element being exposed. In the conventional flow in the opposite direction, oil would enter through outlets 72 and distribution over the filter would be less efficient. The oil passes through the filter element 66 and out through outlets 72, to return to the engine through metering port 42 and outlet duct 44.

Since the filter is of the partial flow type and only a portion of the oil is bypassed through the filter, a blockage or a clogged filter will not cause oil starvation in the engine. When the system is not pressurized, valves 78 and 86 are closed. Thus when the filter cartridge is removed, only the very small amount of oil trapped between the valves is residual and spillage is minimized. The assembly can be installed directly on many existing engines and is easily adapted to others. While the assembly is most efficient with the special valved filter, some types of conventional filters may be used with the adapter, the reversed oil flow providing an improved filter action.

Having described my invention, I now claim.

1. An oil filter for being attached to an oil filter adapter which adapter has a central bore with a threaded plug for passing oil to the filter and a radially displaced oil receiving port for receiving oil from the filter, the filter comprising,
   a cylindrical canister with a closed lower end and a top cap fixed in the upper end,
   a mounting plate positioned in the center of the top cap having a nut portion for engaging the plug of the adapter,
   said top cap having a ring gasket for engaging the adapter and enclosing and sealing the space between the top cap and the adapter including the oil receiving port of the adapter,
   said nut portion of said mounting plate extending into the canister below the top cap with a cylindrical projection,
   a tubular cylindrical core having an upper end fitting around the nut projection and a lower end seated against the closed lower end of said canister,
   a cylindrical filter element for being positioned in said filter around said core and spaced from said lower closed end of said canister,
   a slit diaphragm valve of flexible material mounted in the upper end of said core for passing oil from the adapter plug to the core and preventing reverse oil flow,
   said valve having a cylindrical body that fits around said nut projection between the nut projection and the upper end of said core for sealing the upper end of the core,
   the lower end of said core having openings for passing oil to the lower end of said filter element,
   and said mounting plate having openings for passing oil from the filter element to the adapter receiving port.

2. An oil filter according to claim 1 wherein, said cylindrical body having an outwardly projecting flange that forms a seal between the mounting plate and the upper end of the core.

3. An oil filter according to claim 2 including, a screen filter positioned between the upper end of the filter element and the top cap and mounting plate,
   and a second filter screen for spacing said first screen and the top end of said filter element from said top cap and mounting plate.

* * * * *